United States Patent
Tam

(10) Patent No.: US 10,337,681 B2
(45) Date of Patent: Jul. 2, 2019

(54) ELECTRONIC CANDLE

(71) Applicant: Chi Ming Tam, Hong Kong (CN)

(72) Inventor: Chi Ming Tam, Hong Kong (CN)

( * ) Notice: Subject to any disclaimer, the term of this patent is extended or adjusted under 35 U.S.C. 154(b) by 0 days.

(21) Appl. No.: 15/807,589

(22) Filed: Nov. 9, 2017

(65) Prior Publication Data

US 2018/0135822 A1 May 17, 2018

(30) Foreign Application Priority Data

Nov. 16, 2016 (CN) .......................... 2016 2 1230913

(51) Int. Cl.
| | |
|---|---|
| *F21S 10/04* | (2006.01) |
| *F21S 6/00* | (2006.01) |
| *F21V 14/02* | (2006.01) |
| *F21S 9/02* | (2006.01) |
| *F21V 5/04* | (2006.01) |
| *H01F 7/06* | (2006.01) |
| *H04R 1/02* | (2006.01) |
| *H05B 37/02* | (2006.01) |
| *F21Y 115/10* | (2016.01) |
| *H05B 33/08* | (2006.01) |
| *F21V 23/04* | (2006.01) |
| *F21W 121/00* | (2006.01) |

(52) U.S. Cl.
CPC ............. *F21S 10/046* (2013.01); *F21S 6/001* (2013.01); *F21S 9/02* (2013.01); *F21V 5/04* (2013.01); *F21V 5/041* (2013.01); *F21V 14/02* (2013.01); *H01F 7/064* (2013.01); *H04R 1/028* (2013.01); *H05B 37/0227* (2013.01); *H05B 37/0236* (2013.01); *H05B 37/0245* (2013.01); *F21V 23/0435* (2013.01); *F21V 23/0471* (2013.01); *F21W 2121/00* (2013.01); *F21Y 2115/10* (2016.08); *H05B 33/0845* (2013.01)

(58) Field of Classification Search
CPC ... F21S 10/06; F21S 6/001; F21S 9/02; F21V 5/041; H01F 7/064; H05B 37/0236
See application file for complete search history.

(56) References Cited

U.S. PATENT DOCUMENTS

| | | |
|---|---|---|
| 4,550,363 A | 10/1985 | Sandell |
| 6,454,425 B1 | 9/2002 | Lin |
| 6,616,308 B2 | 9/2003 | Jensen et al. |
| 6,719,443 B2 | 4/2004 | Gutstein |
| 7,093,961 B2 | 8/2006 | Bentley et al. |
| 7,125,142 B2 | 10/2006 | Wainwright |
| 7,159,994 B2 | 1/2007 | Schnuckle et al. |

(Continued)

FOREIGN PATENT DOCUMENTS

CN 203273669 U 11/2013

*Primary Examiner* — Anabel Ton
(74) *Attorney, Agent, or Firm* — Eagle IP Limited; Jacqueline C. Lui

(57) ABSTRACT

An electronic candle includes a housing, a lens, a light emitting device and a flame image controller. The flame image controller includes a bracket, a first permanent magnet and a second permanent magnet. A first end of the bracket connects to the light emitting device and a second of the bracket connects to the second permanent magnet. The flame controller changes a size of an image of a flame by moving the light emitting device in a horizontal direction in response to a first magnetic field applied to the first permanent magnet, and flickers the image of the flame by vibrating the light emitting device in response to a second magnetic field applied to the second permanent magnet.

19 Claims, 11 Drawing Sheets

(56) References Cited

U.S. PATENT DOCUMENTS

| | | |
|---|---|---|
| 7,261,455 B2 | 8/2007 | Schnuckle et al. |
| 7,360,935 B2 | 4/2008 | Jensen et al. |
| 7,828,462 B2 | 11/2010 | Jensen |
| 7,837,355 B2 | 11/2010 | Schnuckle |
| 8,070,319 B2 | 12/2011 | Schnuckle et al. |
| 8,157,425 B2 | 4/2012 | Gutstein et al. |
| 8,282,251 B2 | 10/2012 | Fournier et al. |
| 8,342,721 B2 | 1/2013 | Park et al. |
| 8,534,869 B2 | 9/2013 | Patton et al. |
| 8,696,166 B2 | 4/2014 | Patton et al. |
| 8,721,118 B2 | 5/2014 | Patton et al. |
| 8,727,569 B2 | 5/2014 | Schnuckle et al. |
| 8,789,986 B2 | 7/2014 | Li |
| 8,926,137 B2 | 1/2015 | Li |
| 2012/0134157 A1 | 5/2012 | Li |
| 2014/0218903 A1 | 8/2014 | Sheng |
| 2014/0254148 A1 | 9/2014 | Fournier |
| 2017/0122512 A1 | 5/2017 | Yuan |

Section B-B'

ELECTRONIC CANDLE

FIELD OF THE INVENTION

The present invention relates to methods and apparatus that improve electronic candles to achieve a higher degree of simulation of a real candle flame.

BACKGROUND

Candles make light by setting fire to the wick. A real candle flame undergoes ignition, growth, spread, decay and extinction, and this behavior of a real candle flame makes it dynamic and difficult to simulate. Methods and apparatus that assist in advancing technological needs and industrial applications in producing a dynamic candle flame by an electronic candle are desirable.

SUMMARY OF THE INVENTION

One example embodiment is an electronic candle that includes a housing, a lens, a light emitting device, a flame image controller. The housing includes an opening on a top surface. The lens is mounted at the opening of the housing. The light emitting device is disposed within the housing. Light emitted from the light emitting device passes through the lens and produces an image of a flame that extends above the opening of the housing. The flame image controller is disposed within the housing and includes a bracket, a first permanent magnet and a second permanent magnet. A first end of the bracket connects to the light emitting device and a second end of the bracket connects to the second permanent magnet. The flame controller changes a size of the image of the flame that extends above the housing by moving the light emitting device in a horizontal direction with respect to the lens in response to a first magnetic field applied to the first permanent magnet. The flame image controller flickers the image of the flame that extends above the housing by vibrating the light emitting device in response to a second magnetic field applied to the second permanent magnet Other example embodiments are discussed herein.

DETAILED DESCRIPTION

Figure 1:
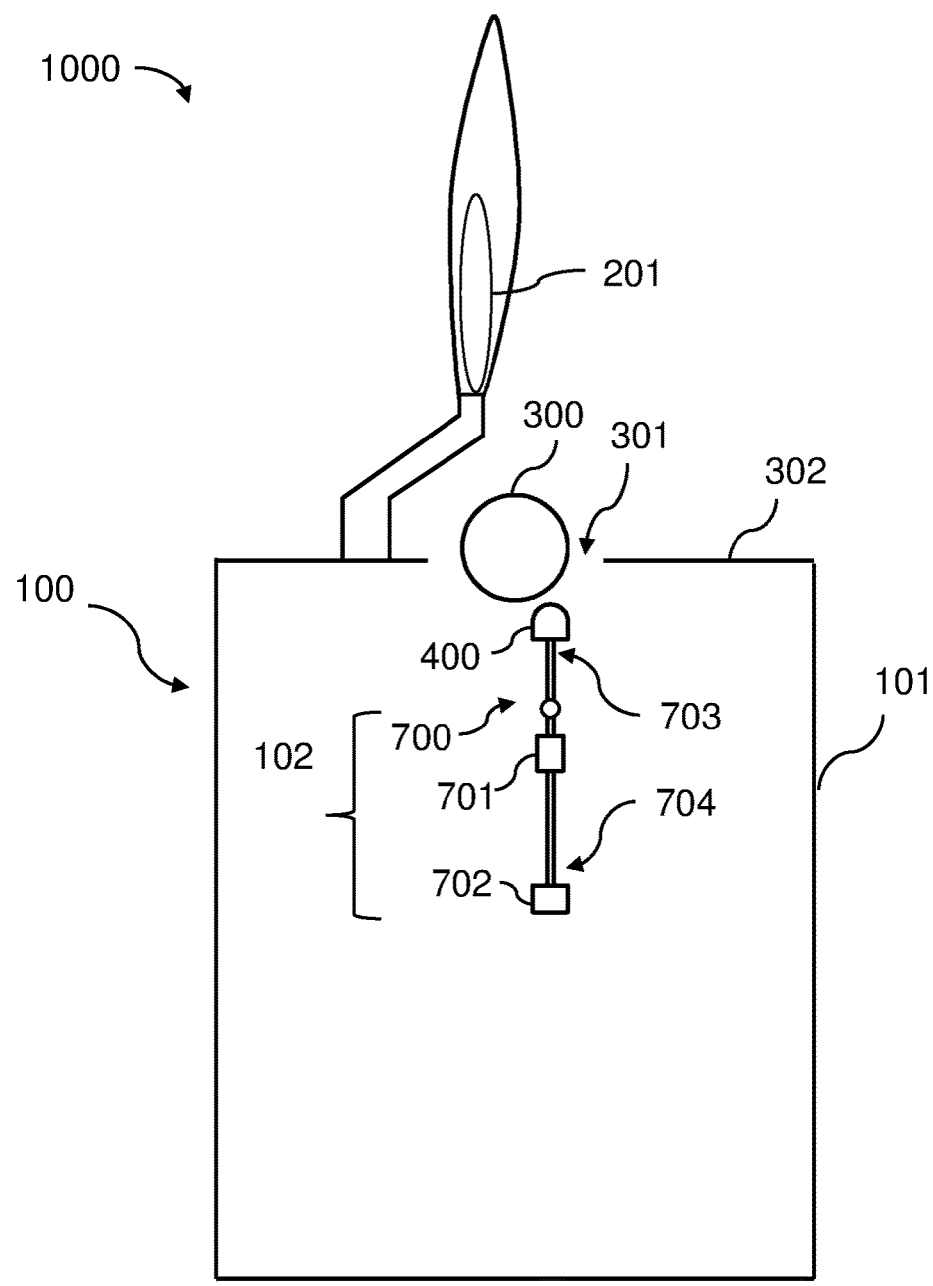
FIG. 1 shows an electronic candle in accordance with an example embodiment.

Example embodiments relate to methods and apparatus that generate an image of a candle flame with an electronic candle.

Electronic candles are popular because they are safe, environmental friendly and long-lasting for illumination. They can have remote capability and timer functions that provide light in places that are difficult to reach. Also, electronic candles are ornamental and decorative. An electronic candle imitates an ignited state of a traditional mineral candle and creates a calming and peaceful atmosphere that helps people mentally relax.

Since it is technically difficult to install a mechanical device that generates dynamic movement in a handheld portable electronic candle, conventional or existing electronic candles just have a transparent or translucent physical structure enclosing a light-emitting diode (LED) that does not move. Methods are used in an attempt to imitate the dynamic properties of a real candle flame, e.g. moving a physical structure that has a profile of a candle flame, but only low degree of simulation of a candle flame is achieved. Conventional or existing electronic candles thus face limitations in many applications since such conventional candles do not fully simulate a real flame of a candle.

Example embodiments solve the above-stated problems or difficulties by providing new methods and apparatus that improve the construction of electronic candles to achieve a higher degree of simulation of a real candle flame. Example embodiments thus enrich or facilitate the implementation of candle lights in different situations and applications.

Example embodiments include a method that imitates the dynamic properties of a real candle flame to provide a more realistic experience and stronger aesthetic feeling to users. Example embodiments simulate one or more of the following: igniting or starting a candle flame, extinguishing or putting out a candle flame, flickering a candle flame, moving a candle flame, and changing size of a candle flame.

In one example embodiment, an image of a candle flame is generated with a handheld portable electronic candle. A light emitting device and a lens are housed inside the handheld portable electronic candle. Light from the light emitting device is directed through the lens to produce the image of the candle flame on a screen. The light emitting device is moved in a first horizontal or lateral direction with respect to the lens to increase a size of the image of the candle flame on the screen. The light emitting device is moved in a second horizontal or lateral direction with respect to the lens to decrease the size of the image of the candle flame on the screen.

Example embodiments satisfy different needs or desires of users by producing images of candle flames with different sizes.

Example embodiments provide more functions or applications of electronic candles by controlling a movement of a flame image in response to signal received from a physical environment.

Example embodiments provide more visual effects by generating a plurality of flame images that have dynamic effects with a plurality of electronic candles.

FIG. 1 shows an electronic candle 100 in an example embodiment. The electronic candle 100 includes a housing 101 that includes an opening 301 on a top surface 302, a lens 300 mounted at the opening 301 of the housing 101, a light emitting device 400 disposed within the housing 101, and a flame image controller 102 disposed within the housing. Light emitted from the light emitting device 400 passes through the lens 300 and produces an image of a flame 201 that extends above the opening 301 of the housing. The flame image controller 102 includes a bracket 700, a first permanent magnet 701 and a second permanent magnet 702. A first end 703 of the bracket 700 connects to the light emitting device 400 and a second end 704 of the bracket 700 connects to the second permanent magnet 702. The flame image controller 102 changes a size of the image of the flame 201 that extends above the housing 101 by moving the light emitting device 400 in a horizontal direction with respect to the lens 300 in response to a first magnetic field applied to the first permanent magnet 701. The flame image controller 102 flickers the image of the flame 201 that extends above the housing 101 by vibrating the light emitting device 400 in response to a second magnetic field applied to the second permanent magnet 702.

Figure 2:
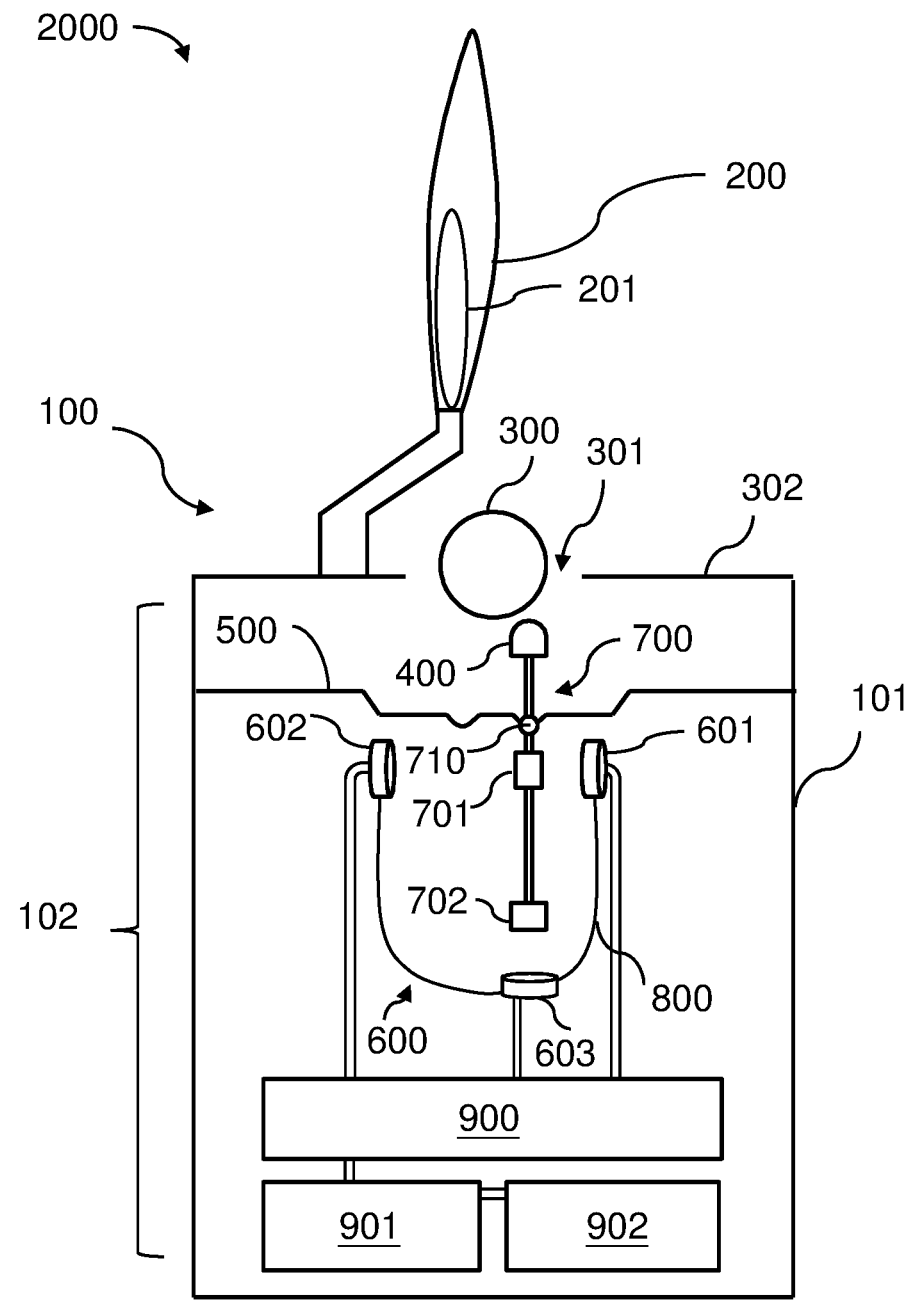
FIG. 2 shows an electronic candle in accordance with an example embodiment.

FIG. 2 shows an electronic candle 100 in accordance with an example embodiment. Like numbers in FIGS. 1 and 2 are used to indicate similar or same elements. As shown in FIG. 2, the flame image controller 102 further includes, but not limited to, one or more of the following elements: a rod 500, a first electromagnet 601, a second electromagnet 602, a third electromagnet 603, an electrical controller 900, a processor 901 and a receiver 902. The rod 500 is disposed horizontally with respect to the lens 300 passing through an aperture 710 of the bracket 700 such that the bracket 700 and the light emitting device 400 move along the rod 500 in the horizontal direction. The first permanent magnet 701 is disposed between the first electromagnet 601 and the second electromagnet 602 so that the first electromagnet 601 and the second electromagnet 602 apply the first magnetic field to the first permanent magnet 701. The third electromagnet 603 is disposed adjacent to the second permanent magnet 702 so that the third electromagnet 603 applies the second magnetic field to the second permanent magnet 702. By way of example, the electronic candle 100 includes, but not limited to, a U-shaped hanger 800, in which a first end of the U-shape hanger 800 connects to the first electromagnet 601 and a second end of the U-shape hanger 800 connects to the second electromagnet 602. By way of example, the third electromagnet 603 is held by the U-shaped hanger 800. The electrical controller 900 electrically connects to the first electromagnet 601, the second electromagnet 602, and the third electromagnet 603. The processor 901 communicates to the electrical controller 900. The processor 901 communicates with the electrical controller 900 to change current flowing through the first electromagnet 601, the second electromagnet 602 and the third electromagnet 603 in response to an electrical signal based on an execution of a non-transitory computer-readable medium having stored therein instructions. By way of example, the receiver 902 receives sound from a wired or wired network and the processor 901 transforms the sound into the electrical signal and adjusts the size of the image of the flame 201 formed on a screen 200 in response to the sound.

Figure 3A:
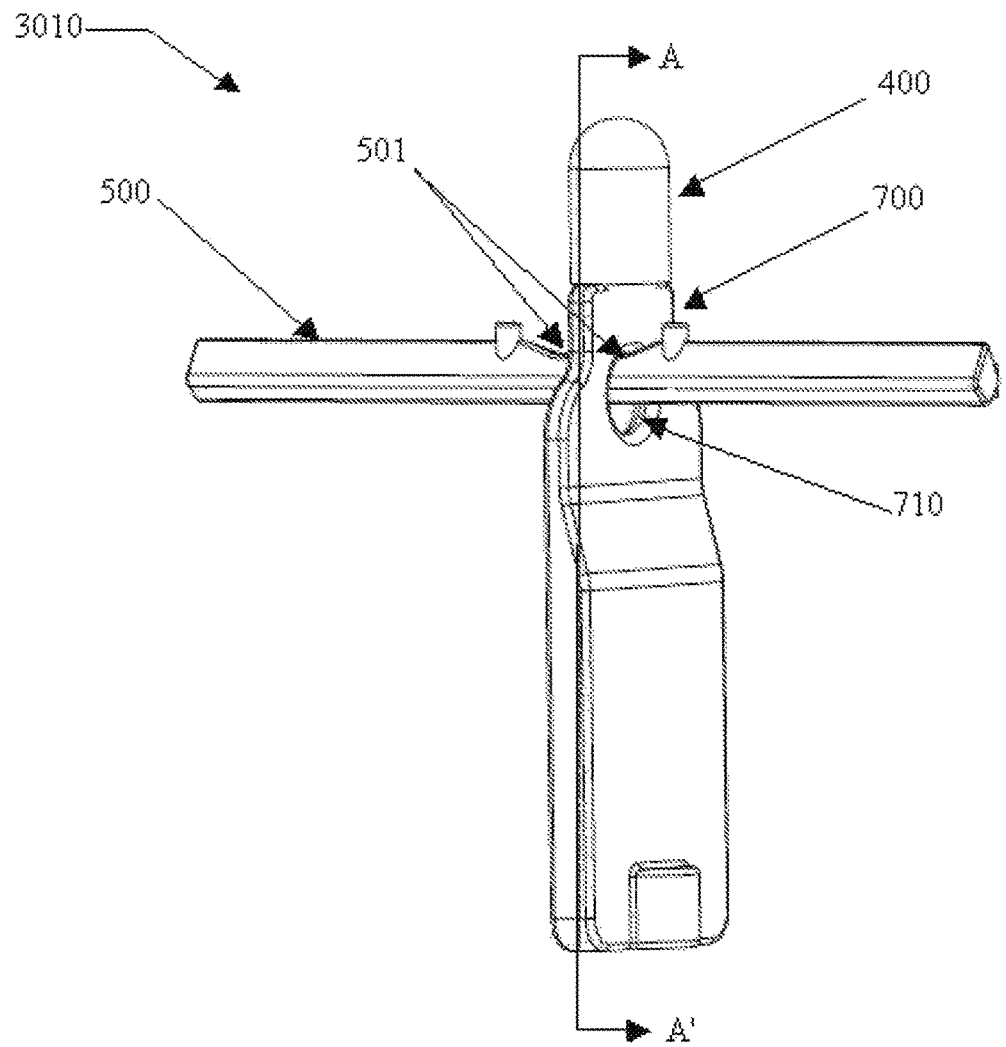
FIG. 3A shows a rod and a bracket of an electronic candle in accordance with an example embodiment.

FIG. 3A shows a rod 500 and a bracket 700 of an electronic candle in an example embodiment. The rod 500 passes through an aperture 710 of the bracket 700 such that the bracket 700 and a light emitting device 400 move along the rod 500 in a horizontal direction. By way of example, the rod 500 includes at least two recesses 501 that receive and hold the bracket 700. By way of example, the at least two recesses 501 have a depth ranges from 0.1 to 0.5 mm which allows the bracket 700 to be moved when receiving magnetic field and be hold in position. By way of example, when the first magnetic field is applied on the bracket 700, the bracket 700 moves from one to another of the at least two recesses 501 and is maintained in the position without further displacement. By way of example, the first magnetic field creates stronger magnetic interaction than the second magnetic field to change the position of the bracket 700. By way of example, the number of recess depends on application of the electronic device. A gradual change of a size of a candle flame can be made by increasing the number of recess on the rod 500.

Figure 3B:
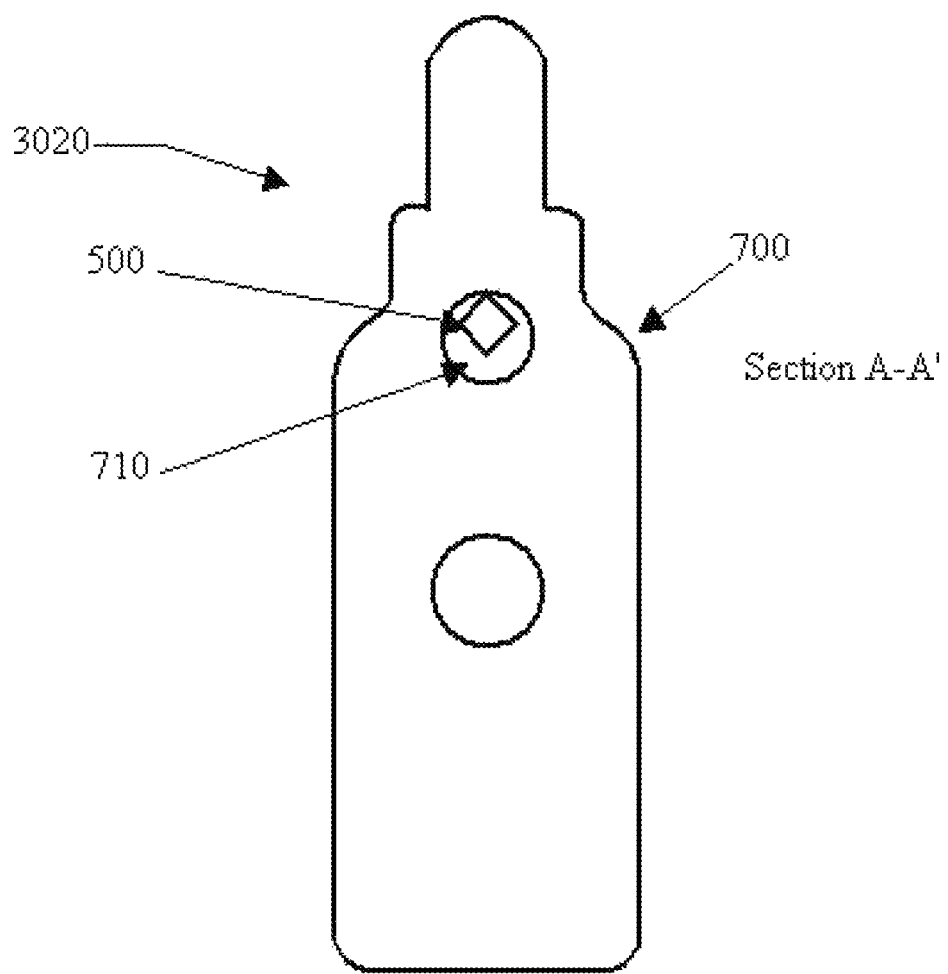
FIG. 3B shows a section view of the rod and a section view of the bracket along the line A-A' of the electronic candle shown in FIG. 3A.

FIG. 3B shows a section view of the rod 500 and a section view of the bracket 700 along the line A-A' of the electronic candle 100 in the example embodiment illustrated in FIG. 3A. By way of example, the rod 500 has a diamond shape in a cross-sectional view. By way of example, the rod 500 has a diamond shape with a tip of diamond shape contacting the bracket 700 so that a contacting area between the bracket 700 and the rod 500 is minimum. The bracket 700 is allowed to move or oscillate in highest flexibility in terms of direction and amplitude when the contacting area is minimum. By way of example, the tip of diamond shape is round. By way of example, a cross-section of the rod 500 is not restricted to a diamond shape, e.g. a triangle shape with a tip of the triangle shape contacting the bracket 700.

Figure 4A:
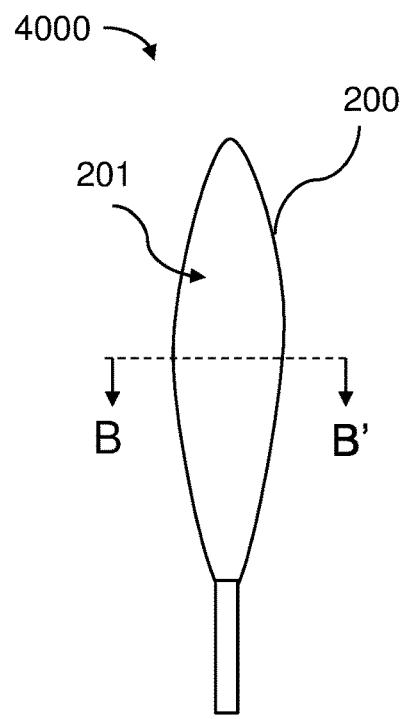
FIG. 4A shows a screen of an electronic candle in accordance with an example embodiment.
Figure 4B:
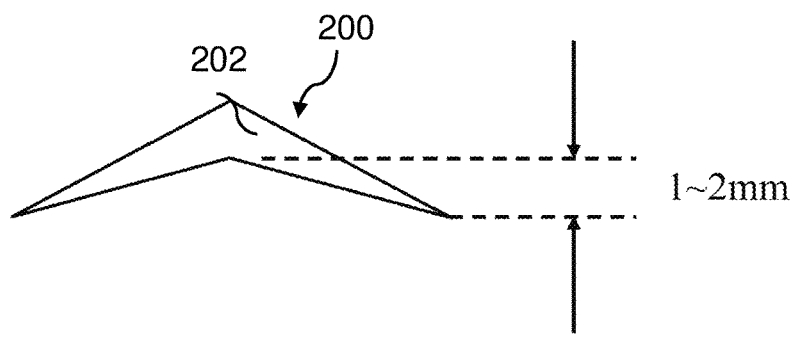
FIG. 4B shows a section view of the screen along the line B-B' of the electronic candle shown in 4A.

FIG. 4A shows a screen 200 of an electronic candle in an example embodiment and FIG. 4B shows a section view of the screen 200 along the line B-B' of the electronic candle in accordance with the example embodiment illustrated in FIG. 4A. By way of example, the screen 200 has a depression 202 at a center with respect to four sides of the screen 200 so that the image of the flame 201 formed on the screen 200 imitates a candle flame with an acute head. By way of example, the depression 202 is a fold. By way of example, a depth of the depression 202 ranges from 1 to 2 mm. By way of example, the screen 200 can be any shape, such as a leaf or a tongue shape. By way of example, a portion of the screen 200 is exposed outside and above a housing of the electronic candle. By way of example, an entire screen 200 is exposed outside and above a housing of the electronic candle.

Figure 5:
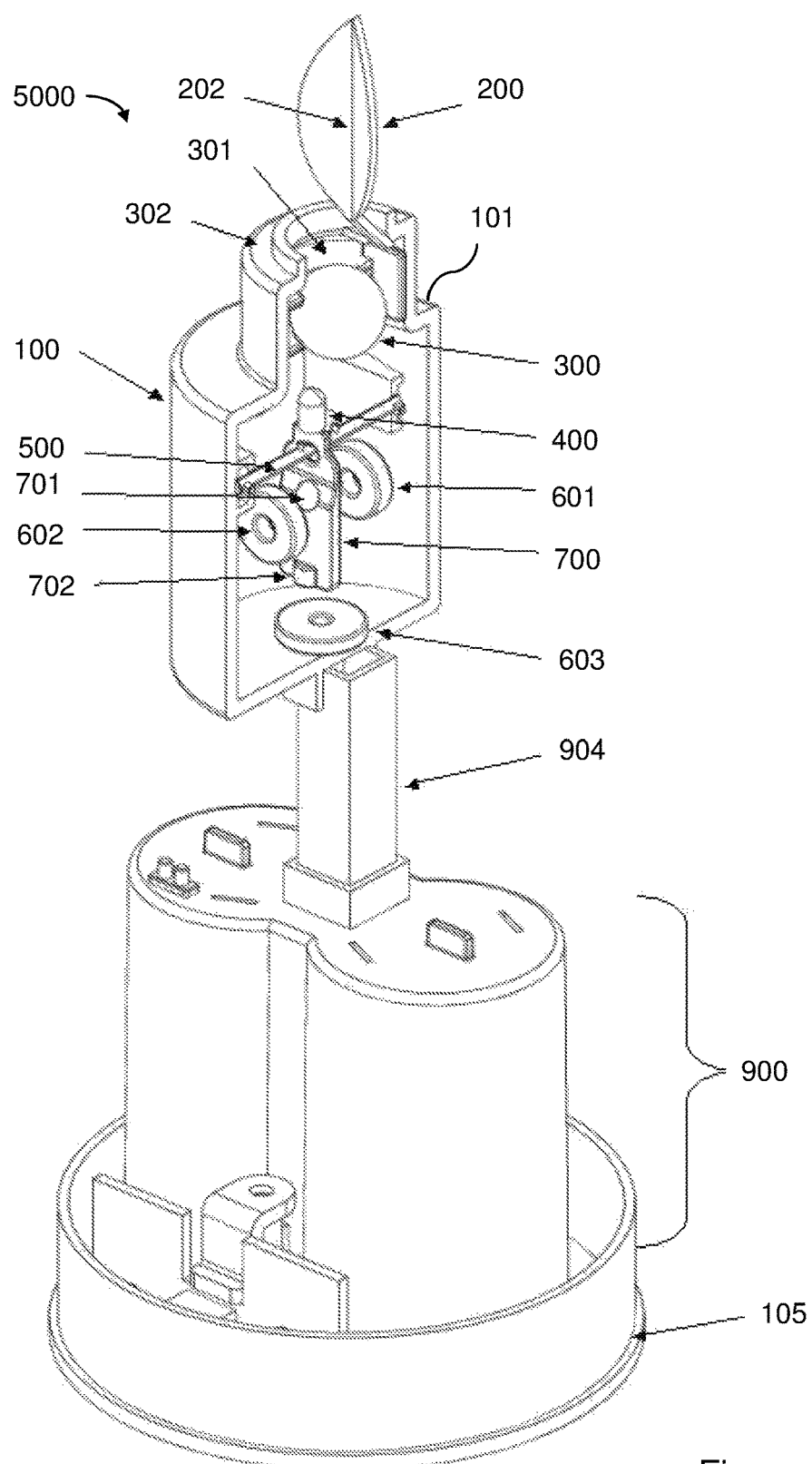
FIG. 5 shows a handheld portable electronic candle in accordance with an example embodiment.

FIG. 5 shows a handheld portable electronic candle 100 in accordance with an example embodiment. The handheld portable electronic candle 100 includes a housing 101 that includes a base 105 and a top surface 302 with an opening 301, a lens 300 at the opening 301 of the housing 101, a screen 200 connected to the housing 101 and extending above the opening 301, a light emitting device 400 in the housing 101, a bracket 700 in the housing 101 and including a permanent magnet 701, a first electromagnet 601 and a second electromagnet 602 in the housing. By way of example, the light emitting device 400 and the lens 300 are housed inside the handheld portable electronic candle since there is a sidewall extending upward from the top surface 302 at the opening 301. Light emitted from the light emitting device passes through the lens and generates an image of a candle flame on the screen. The first electromagnet 601 and the second electromagnet 602 generate a magnetic field that applies to the permanent magnet 701 and causes the bracket 700 and the light emitting device 400 to move in a horizontal direction with respect to the spherical lens 300 in order to change a size of the image of the candle flame on the screen. The handheld portable electronic candle 100 further includes a second permanent magnet 702 and a third electromagnet 603. The third electromagnet 603 generates a magnetic field that applies to the second permanent magnet 702 and causes the bracket 700 and the light emitting device 400 to oscillate in order to flicker the image of the candle flame on the screen. The handheld portable electronic candle 100 further includes an extendable bar 904 which adjusts the height of the handheld portable electronic candle 100 for different applications. By way of example, the screen 200 has a depression 202 which is a fold. By way of example, the screen rigidly connects to the housing 101 such that the screen does not move with respect to the housing 101. The handheld portable electronic candle 100 includes a rod 500. By way of example, the rod 500 is disposed horizontally with respect to the lens 300 within the housing 101. The material of the rod 500 is selected from a group consisting of metal and plastic.

Figure 6:
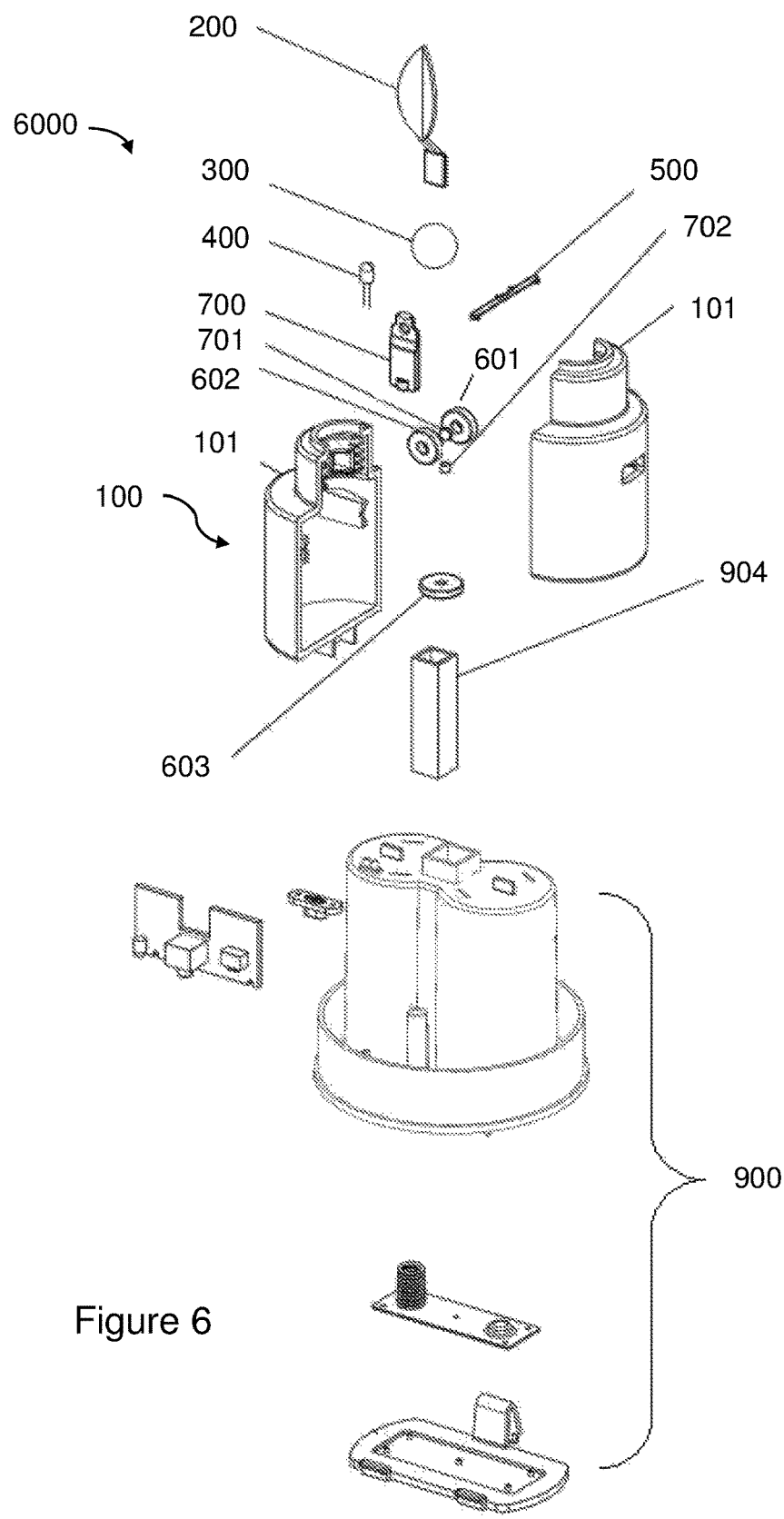
FIG. 6 shows an exploded view of a handheld portable electronic candle in accordance with an example embodiment.

FIG. 6 shows an exploded view of a handheld portable electronic candle 100 in accordance with the example embodiment. The handheld portable electronic candle 100 includes an electrical controller 900 which electrically connects a power supply to the first electromagnet 601, the second electromagnet 602, and the third electromagnet 603 (connection not shown). The handheld portable electronic candle 100 further includes an extendable bar 904 which adjusts the height of the handheld portable electronic candle 100 for different applications. By way of example, the power supply is a battery assembly includes batteries. By way of example, the electrical controller 900 includes a switch (not shown) that controls current flowing through the first electromagnet 601, the second electromagnet 602, and the third electromagnet 603 for manual control.

Figure 7:
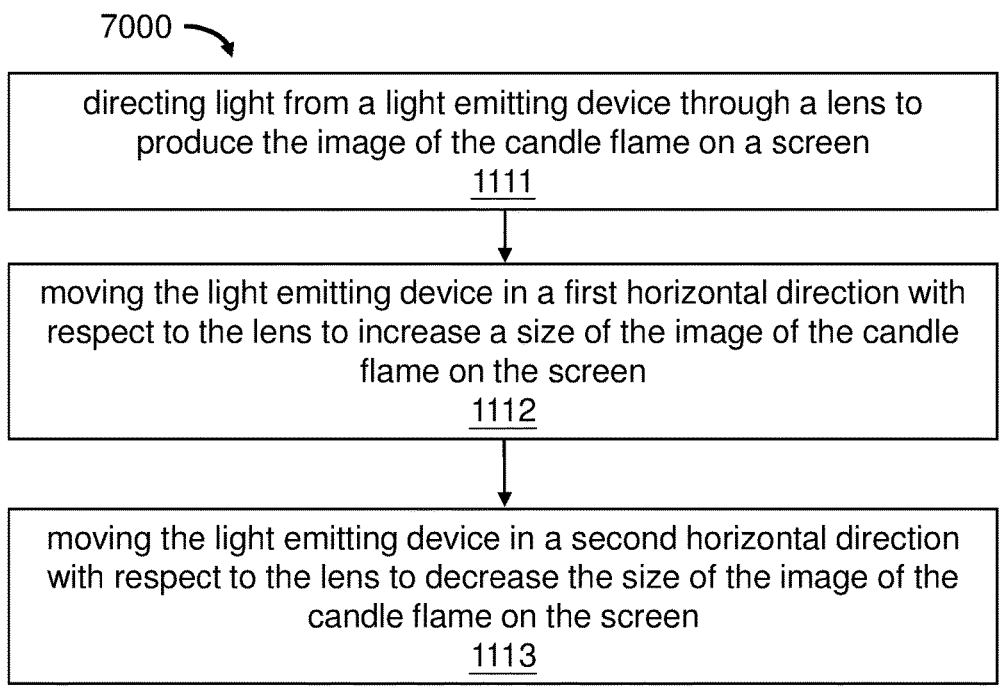
FIG. 7 shows a method that generates an image of a candle flame with an electronic candle in accordance with an example embodiment.

FIG. 7 shows a method to generate an image of a candle flame with an electronic candle in one example embodiment. By way of example, the electronic candle is a handheld portable electronic candle which encloses a light emitting device and a lens.

Block 1111 shows directing light from the light emitting device through the lens to produce the image of the candle flame on a screen.

By way of example, the lens is a spherical lens or a lens with another shape that converges the light emitted from the light emitting device to the screen.

Block 1112 shows moving the light emitting device in a first horizontal direction with respect to the lens to increase a size of the image of the candle flame on the screen.

By way of example, the light emitting device is moved in the first horizontal or lateral direction with respect to the lens and alters an optical path to form an image of the candle flame on the screen with an increased size.

Block 1113 shows moving the light emitting device in a second horizontal direction with respect to the lens to decrease the size of the image of the candle flame on the screen.

By way of example, the light emitting device is moved in the second horizontal or lateral direction with respect to the lens and alters an optical path to form an image of the candle flame on the screen with a decreased size.

By way of example, the light emitting device connects to a first magnet by a bracket such that the light emitting device and the bracket move with the first magnet, and a first magnetic field is applied to the first magnet to move the light emitting device in the first horizontal direction and the second horizontal direction.

By way of example, the light emitting device connects to a first permanent magnet by a bracket, and the first permanent magnet is placed between a first electromagnet and a second electromagnet. By way of example, the first electromagnet and the second electromagnet attract and repel the first permanent magnet such that the light emitting device is horizontally displaced in the example embodiment.

Figures 8A, 8B:
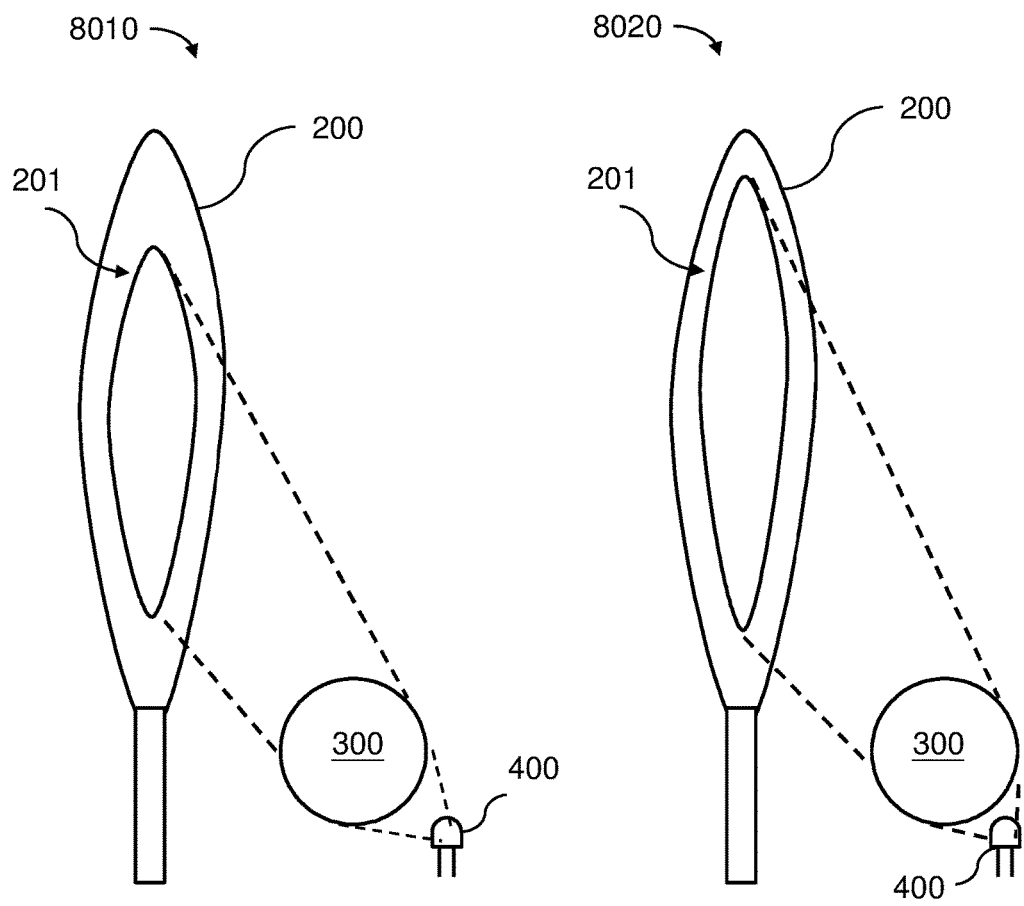
FIG. 8A shows an image of a candle flame on a screen in accordance with an example embodiment.
FIG. 8B shows an image of a candle flame on a screen in accordance with an example embodiment.

FIG. 8A and FIG. 8B show an image of a candle flame 201 on a screen 200 in accordance with an example embodiment. By moving the light emitting device 400 in a first horizontal direction with respect to the lens 300, a size of the image of the candle flame 201 on the screen 200 increases. By moving the light emitting device 400 in a second horizontal direction with respect to the lens 300, a size of the image of the candle flame 201 on the screen 200 decreases. FIG. 8A shows an image of the candle flame 201 with a decreased size and FIG. 8B shows an image of the candle flame with an increased size as a result of a change of direction of light from the light emitting device 400 through the lens 300 to the screen 200. The electronic candle in the example embodiment simulates a rising candle flame and a shrinking candle flame.

In one example embodiment, a flame image controller changes a size of an image of the flame to a largest size when the electronic candle is switched on. By way of example, the electronic candle in the example embodiment applies in a situation when the environment is in entire darkness and requires immediate brightest illumination.

In one example embodiment, a method to generate an image of a candle flame with an electronic candle includes changing an amount of power supplied to a light emitting device to change an intensity of the image of the candle flame. The electronic candle in the example embodiment simulates igniting or starting a candle flame, extinguishing or putting out a candle flame. Example embodiments also achieve a flashing of a candle light by providing power supplies to the light emitting device intermittently.

In another example embodiment, a method to generate an image of a candle flame with an electronic candle includes oscillating a light emitting device to flicker the image of the candle flame. The electronic candle in the example embodiment simulates a flickering of a candle flame. By way of example, the image of the candle flame is generated by connecting the light emitting device to a second magnet by a bracket such that the light emitting device and the bracket move with the second magnet; and a second magnetic field is applied to the second magnet to oscillate the light emitting device.

Figure 9:
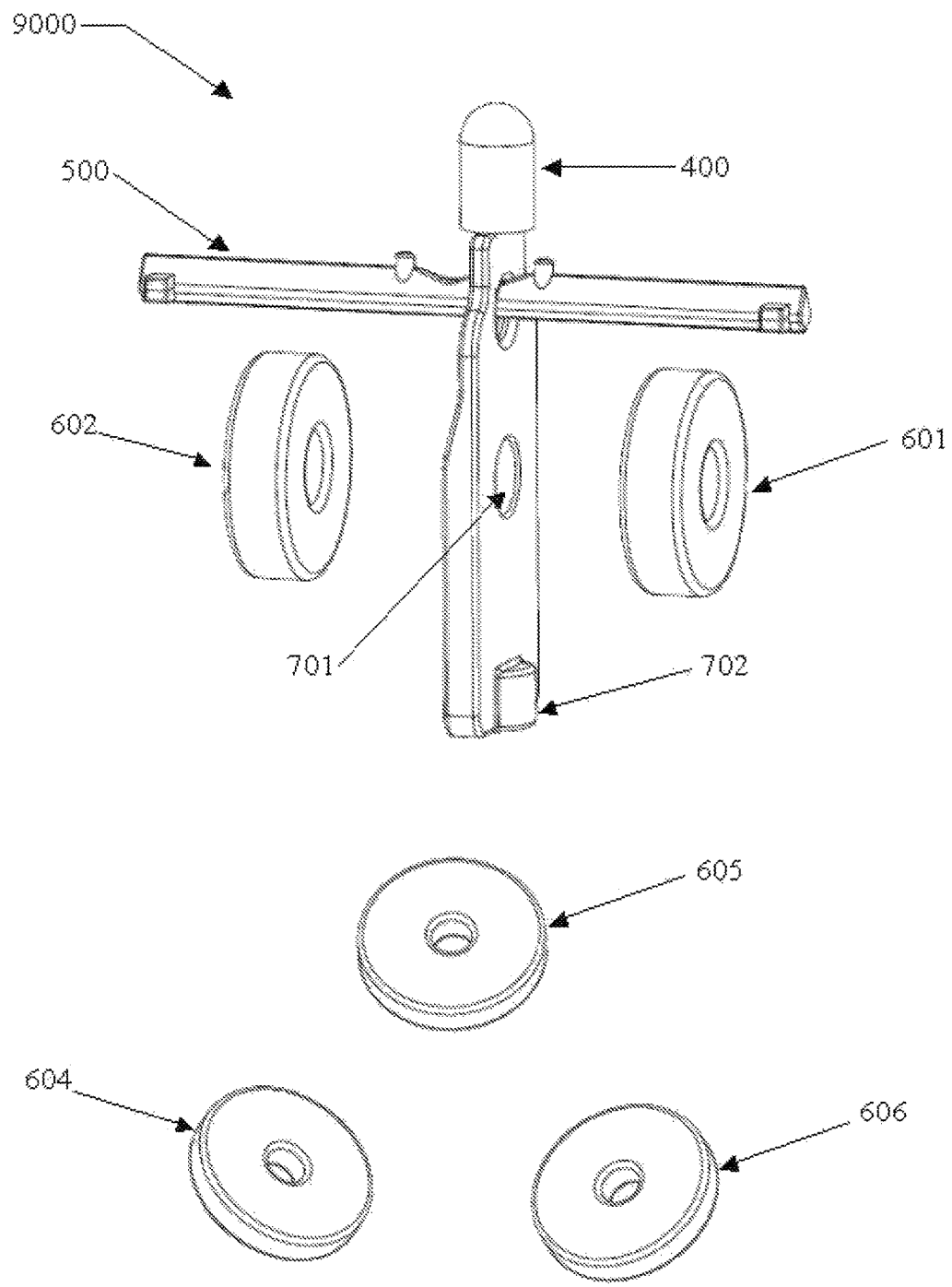
FIG. 9 shows a portion of an electronic candle in accordance with an example embodiment.

A method to generate a candle flame in an example embodiment includes connecting a light emitting device with a second permanent magnet by a bracket; and placing at least one electromagnet adjacent to the second permanent magnet. The at least one electromagnet attracts and repels the second permanent magnet such that the light emitting device oscillates in the example embodiment. By way of example, even when current stops flowing in the at least one electromagnet, the electronic candle still moves as a result of inertia and thus the dynamic properties of the image of the candle flame is maintained for a period once the electronic candle is switched off. By way of example, the current supplied to the at least one electromagnet is intermittent. By way of example, FIG. 9 shows a portion of an electronic candle in which three electromagnets 605, 604, 606 are disposed adjacent to the second permanent magnet 702 in one example embodiment. The three electromagnets 605, 604, 606 attract and repel the second permanent magnet 702 and thus oscillate the light emitting device 400.

Figure 10:
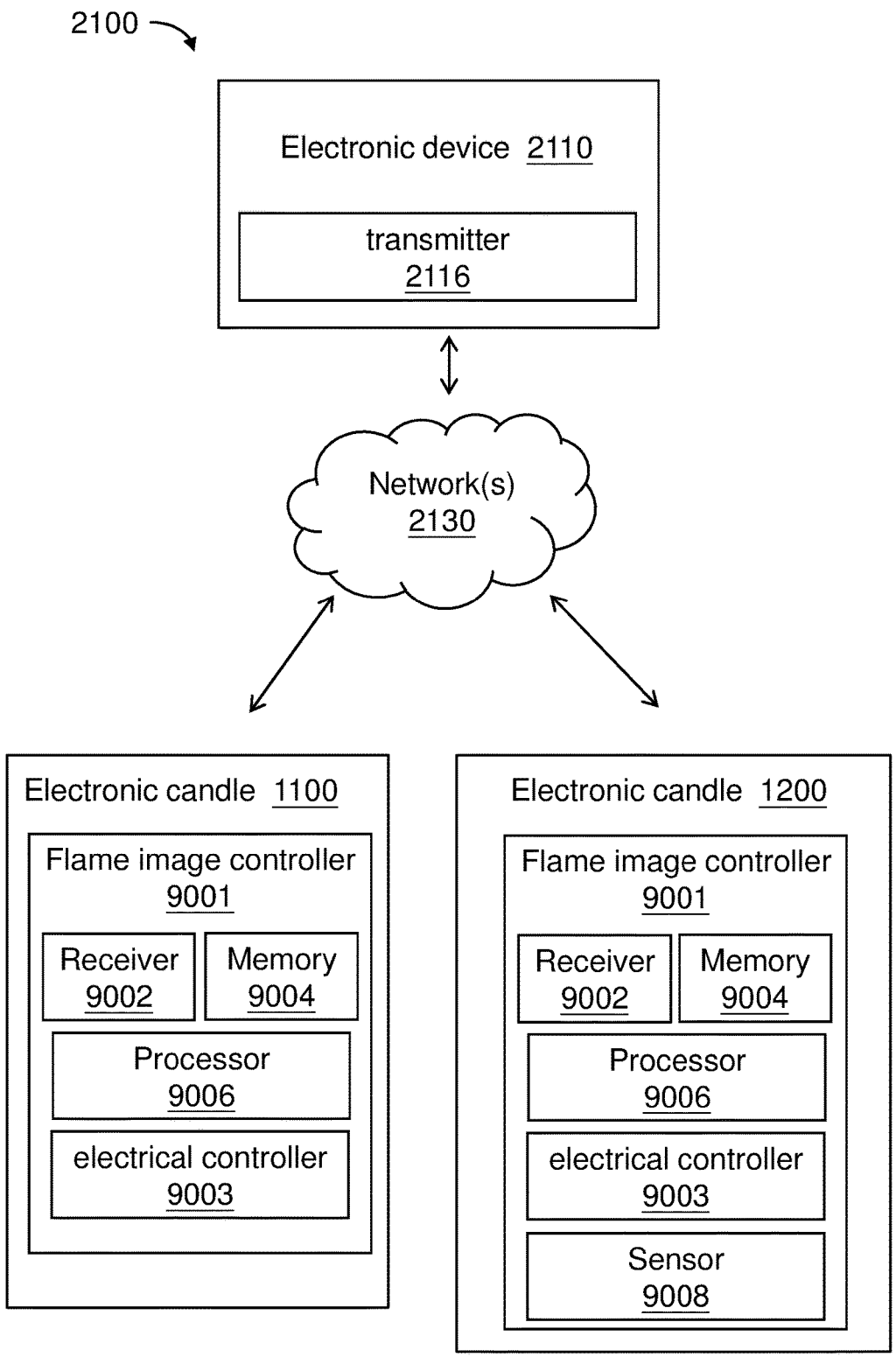
FIG. 10 shows a communication between an electronic device, a network and electronic candles in an example embodiment.

FIG. 10 shows a communication between an electronic device 2110, a network 2130 and electronic candles 1100 and 1200 in an example embodiment. The electronic candle 1100 and an electronic candle 1200 include flame image controller 9001 which includes one or more of a processor or processing unit 9006, memory 9004 and receiver 9002 that respond to signals transmitted over a network 2130 by changing a size of an image of a flame produced from a light emitting device passing through a lens and by flickering the image of the flame. By way of example, the signals are transmitted from the electronic device 2110. The electronic candle 1200 further includes a sensor 9008. The sensor 9008 detects and responds to a specific input from an environment by sending electrical signal to the processor 9006. The flame image controller 9001, processor 9006, memory 9004, and/or receiver 9002 execute methods in accordance with example embodiments. The flame image controller 9001 can include software and/or specialized hardware to execute example embodiments.

By way of example, the sensor 9008 is a sound sensor that detects a sound intensity of an environment. By way of example, the sensor 9008 is a touch sensor that detects touch or near proximity without relying on physical contact.

By way of example, the receiver 9002 receives signal transferred from a transmitter 2116 of an electrical device 2110 over a network 2130. By way of example, the signal is sound signal.

By way of example, the electronic device 2110 includes a computer program or software application that performs tasks for users. Examples of an electronic device include, but not limited to, laptop computers, desktop computers, tablet computers, handheld portable electronic devices (HPEDs), and other portable and non-portable electronic devices a mobile device or a computer.

By way of example, the network 2130 can include one or more of a wired network, wireless network for communicating one or more signals via Bluetooth, Wi-Fi, infrared or RF, such as internet, cellular network, a wireless voice network, etc.

The processor unit includes a processor (such as a central processing unit, CPU, microprocessor, microcontrollers, field programmable gate array (FPGA), application-specific integrated circuit (ASIC), etc.) for controlling the overall operation of memory (such as random access memory (RAM) for temporary data storage, read only memory (ROM) for permanent data storage, and firmware).

By way of example, the processor 9006 transforms the signal received from the sensor 9008 or the receiver 9002 into an electrical signal. By way of example, the processor transforms the sound signal into an electrical signal.

By way of example, a non-transitory computer-readable medium having stored therein instructions that when executed cause the processor 9006 to communicate with the electrical controller 9003 in the flame image controller 9001.

By way of example, the electrical controller 9003 electrically connects to a first electromagnet, a second electromagnet, and a third electromagnet and changes current flowing through the first electromagnet, the second electromagnet, and third electromagnet in response to the electrical signal. The first electromagnet and the second electromagnet generate the first magnetic field, and the third electromagnet generates the second magnetic field. By way of example, the flame image controller 9001 changes the size of the image of the flame by moving the light emitting device in a horizontal direction with respect to the lens in response to a first magnetic field applied to the first permanent magnet, and the flame image controller 9001 flickers the image of the flame by vibrating the light emitting device in response to a second magnetic field applied to the second permanent magnet.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

While example embodiments include one or more electromagnet to generate "magnetic field" to create magnetic interaction between one or more permanent magnets and the one or more electromagnets, or apply magnetic force or magnetic influence on the one or more permanent magnets, such that the bracket is allowed to move, it is within the scope of the present invention to interchange between permanent magnets and electromagnets or replace by any magnetizable member to carry out the example embodiments.

As used herein, "light emitting device" is an electronic device that converts electrical energy to light emission. For example, it can be a light-emitting diode (LED) that produces light of any color by electroluminescence.

As used herein, "lens" converges or bends light emitted from a light emitting device and forms an image on a screen, and is not limited to any shape, material and surface treatment. For example, it can be a convex lens or a spherical lens or combination of both. For example, it can be made of plastic or glass.

What is claimed is:
1. An electronic candle, comprising:
a housing that includes an opening on a top surface;

a lens mounted at the opening of the housing;
a light emitting device disposed within the housing, wherein light emitted from the light emitting device passes through the lens and produces an image of a flame that extends above the opening of the housing; and
a flame image controller disposed within the housing and including a bracket, a first permanent magnet, and a second permanent magnet,
wherein a first end of the bracket connects to the light emitting device, and a second end of the bracket connects to the second permanent magnet,
wherein the flame image controller changes a size of the image of the flame that extends above the housing by moving the light emitting device in a horizontal direction with respect to the lens in response to a first magnetic field applied to the first permanent magnet, and
wherein the flame image controller flickers the image of the flame that extends above the housing by vibrating the light emitting device in response to a second magnetic field applied to the second permanent magnet.

2. The electronic candle of claim 1, wherein the flame image controller further includes:
a rod disposed horizontally with respect to the lens passing through an aperture of the bracket such that the bracket and the light emitting device move along the rod in the horizontal direction,
wherein the rod includes at least two recesses that receive and hold the bracket,
wherein the rod has a diamond shape in a cross-sectional view.

3. The electronic candle of claim 1, wherein the flame image controller further includes:
a first electromagnet and a second electromagnet, wherein the first permanent magnet is disposed between the first electromagnet and the second electromagnet so that the first electromagnet and the second electromagnet apply the first magnetic field to the first permanent magnet; and
a third electromagnet disposed adjacent to the second permanent magnet so that the third electromagnet applies the second magnetic field to the second permanent magnet.

4. The electronic candle of claim 1, wherein the flame image controller further includes:
an electrical controller that electrically connects to a first electromagnet, a second electromagnet, and a third electromagnet;
a processor that communicates to the electrical controller;
a non-transitory computer-readable medium having stored therein instructions that when executed cause the processor to:
communicate with the electrical controller to change current flowing through the first electromagnet, the second electromagnet, and third electromagnet in response to an electrical signal,
wherein the first electromagnet and the second electromagnet generate the first magnetic field, and the third electromagnet generates the second magnetic field.

5. The electronic candle of claim 1, wherein the flame image controller further includes:
a receiver that receives sound from a wired or wireless network; and
a processor that transforms the sound into an electrical signal and adjusts the size of the image of the flame in response to the sound.

6. The electronic candle of claim 1 further comprising:
a screen connected to the housing,
wherein the screen has a depression at a center with respect to four sides of the screen so that the image of the flame formed on the screen imitates a candle flame with an acute head,
wherein a depth of the depression ranges from 1 to 2 mm.

7. The electronic candle of claim 1 further comprising:
a screen rigidly connected to the housing such that the screen does not move with respect to the housing,
wherein the image of the flame is formed on the screen.

8. The electronic candle of claim 1, wherein the flame image controller changes the size of the image of the flame to a largest size when the electronic candle is switched on.

9. A method to generate an image of a candle flame with a handheld portable electronic candle, the method comprising:
directing light from a light emitting device through a lens to produce the image of the candle flame on a screen;
moving the light emitting device in a first horizontal direction with respect to the lens to increase a size of the image of the candle flame on the screen;
moving the light emitting device in a second horizontal direction with respect to the lens to decrease the size of the image of the candle flame on the screen;
changing an amount of power supplied to the light emitting device to change an intensity of the image of the candle flame; and
oscillating the light emitting device to flicker the image of the candle flame, wherein the light emitting device and the lens are housed inside the handheld portable electronic candle.

10. The method of claim 9 further comprising:
connecting the light emitting device to a first magnet by a bracket such that the light emitting device and the bracket move with the first magnet; and
applying a first magnetic field to the first magnet to move the light emitting device in the first horizontal direction and the second horizontal direction.

11. The method of claim 9 further comprising:
connecting the light emitting device to a second magnet by a bracket such that the light emitting device and the bracket move with the second magnet; and
applying a second magnetic field to the second magnet to oscillate the light emitting device.

12. The method of claim 9 further comprising:
connecting the light emitting device with a first permanent magnet by a bracket; and
placing the first permanent magnet between a first electromagnet and a second electromagnet,
wherein the first electromagnet and the second electromagnet attract and repel the first permanent magnet such that the light emitting device is horizontally displaced.

13. The method of claim 9 further comprising:
connecting the light emitting device with a second permanent magnet by a bracket; and
placing at least one electromagnet adjacent to the second permanent magnet,
wherein the at least one electromagnet attracts and repels the second permanent magnet such that the light emitting device oscillates.

14. A handheld portable electronic candle, comprising:
a housing that includes a base and a top surface with an opening;
a spherical lens at the opening of the housing;

a screen connected to the housing and extending above the opening;

a light emitting device in the housing such that light emitted from the light emitting device passes through the lens and generates an image of a candle flame on the screen;

a bracket in the housing and including a permanent magnet; and a first electromagnet and a second electromagnet in the housing, wherein the first electromagnet and the second electromagnet generate a magnetic field that applies to the permanent magnet and causes the bracket and the light emitting device to move in a horizontal direction with respect to the spherical lens in order to change a size of the image of the candle flame on the screen.

15. The handheld portable electronic candle of claim 14 further comprising:

a second permanent magnet, and a third electromagnet, wherein the third electromagnet generates a magnetic field that applies to the second permanent magnet and causes the bracket and the light emitting device to oscillate in order to flicker the image of the candle flame on the screen.

16. The handheld portable electronic candle of claim 14, wherein the screen rigidly connects to the housing such that the screen does not move with respect to the housing.

17. The handheld portable electronic candle of claim 14, wherein the screen has a depression at a center with respect to four sides of the screen so that the image of the candle flame simulates a candle flame with an acute head.

18. The handheld portable electronic candle of claim 14 further comprising:

a plastic rod disposed horizontally with respect to the lens within the housing such that the plastic rod passes through an aperture of the bracket to enable the bracket and the light emitting device to move along the plastic rod, wherein the plastic rod includes at least two recesses that receive and hold the bracket, wherein a cross-section of the rod has a diamond shape with a tip of diamond shape contacting the bracket.

19. The handheld portable electronic candle of claim 14 further comprising:

a U-shaped hanger, wherein a first end of the U-shape hanger connects to the first electromagnet and a second end of the U-shape hanger connects to the second electromagnet; and an electrical controller that electrically connects to the first electromagnet and the second electromagnet to control current flowing through the first electromagnet and the second electromagnet.

* * * * *